United States Patent [19]

Schäfer et al.

[11] Patent Number: 4,748,843

[45] Date of Patent: Jun. 7, 1988

[54] DIAGNOSTIC SYSTEM FOR A MOTOR VEHICLE

[75] Inventors: Peter Schäfer, Mönsheim; Dieter Marx, Kernen; Roland Ehniss, Karlsruhe; Roland Ebner, Villingen-Schwenningen, all of Fed. Rep. of Germany

[73] Assignee: Dr. Ing. h.c.f. Porsche Aktiengesellschaft, Stuttgart, Fed. Rep. of Germany

[21] Appl. No.: 922,258

[22] Filed: Oct. 23, 1986

[30] Foreign Application Priority Data

Nov. 15, 1985 [DE] Fed. Rep. of Germany ....... 3540599

[51] Int. Cl.[4] .......... G01M 15/00

[52] U.S. Cl. .......... 73/117.3

[58] Field of Search .......... 73/118.1, 119 A, 116, 73/117.2, 117.3, 119 R; 340/52 F; 364/550, 551; 371/29, 16, 20

[56] References Cited

U.S. PATENT DOCUMENTS

| | | | |
|---|---|---|---|
| 3,748,897 | 7/1973 | Rabinowitz | 73/118.1 |
| 4,066,883 | 1/1978 | Wheeler, Jr. | 371/22 |
| 4,234,921 | 11/1980 | Kinoshita et al. | 364/551 |
| 4,246,566 | 1/1981 | Endo et al. | 73/119 A |
| 4,271,402 | 6/1981 | Kastura et al. | 371/29 |
| 4,325,251 | 4/1982 | Kanegae | 73/117.3 |
| 4,437,342 | 3/1984 | Hosaka et al. | 73/119 A |
| 4,497,057 | 1/1985 | Kato et al. | 340/52 F |
| 4,532,593 | 7/1985 | Mouri et al. | 364/431.11 |
| 4,567,756 | 2/1986 | Colborn | 73/118.1 |

FOREIGN PATENT DOCUMENTS

| | | | |
|---|---|---|---|
| 0010814 | 1/1979 | Japan | 73/117.3 |
| 0045563 | 3/1984 | Japan | 371/20 |

OTHER PUBLICATIONS

SAE Technical Paper No. 840151, "An Automotive Electronic Instrument Cluster with a Programmable Non-Volatile Odometer,", 1984.

SAE Technical Paper No. 820901, "General Motor's Computer Command Control-System Development".

*Primary Examiner*—Stewart J. Levy

*Assistant Examiner*—Robert R. Raevis

*Attorney, Agent, or Firm*—Barnes & Thornburg

[57] ABSTRACT

A diagnostic system including a display system in a combination instrument of the motor vehicle and a testing unit connected by a stimulating line (L) and a communication line (K) serial bus system to control systems for selectively reading defect reports from the defined storage areas of the control systems and displaying them on the display system. A diagnostic system is started by plugging a diagnostic plug or an external testing unit into a plug device connected with the testing unit or the bus system.

19 Claims, 9 Drawing Sheets

DIAGNOSTIC SYSTEM FOR A MOTOR VEHICLE

BACKGROUND AND SUMMARY OF THE INVENTION

This invention relates to a diagnostic system for a motor vehicle.

Today's extensive motor vehicles are becoming increasingly complex in their design and thus make it more and more difficult for service personnel to locate defects of systems of the motor vehicle. This is particularly true of intermittent defects that do not result in a breakdown of a system or the motor vehicle but may interfere with its operation.

Although the installation of more and more electronic systems has reduced the frequency of breakdown extensively, the complicated systems do not permit as good an insight as simple mechanical systems of the cause of the breakdown. Also, the service personnel must have extensive electrotechnical or electronical knowledge.

In DE-OS No. 32 29 411, an electronic arrangement with self-monitoring was therefore suggested for a motor vehicle. An electronic control system for the control of the operation of motor vehicle devices, in this case, is equipped with a defect detecting device that can determine defects in sections of the system. It also comprises a storage area for the storage of defect data and addresses, a defect display means and a microcomputer having an input and display unit that is assigned to the control system.

However, this system is relatively costly and requires a special vehicle information system with a separate display and input unit. Also, if by means of this system several electronic control units are to be monitored, a separate bus system is required in each case from the vehicle information system to the respective control system. However, this results in high wiring expenditures. The system is therefore costly and expensive and requires a lot of space for the additional elements. It is therefore difficult to house in the narrow space of a dashboard of a motor vehicle.

In the U.S. journal *Electronics*, Nov, 20, 1980, on Pages 113 to 122, electronic control systems are described that are equipped with a self-monitoring function. However, these use a central light unit or a central display field by means of which defect reports can be emitted from the control systems via a flashing code. It is true that this simple type of defect display is space-saving but the number of types of defects that can be shown is limited by the number of different and clearly detectable flash patterns because many information units that in each case appear only for a short period of time are difficult to combine into a clear and correct overall information.

A combination instrument, described in this journal as having a defect display in code form via an electronic speed indicator, reduces the above-described problems but is used only for the monitoring or diagnostic display of defects in the combination instrument itself. Control systems of other motor vehicle devices, on the other hand, cannot be connected to this diagnostic system. They require the above-described additional flashing light unit.

It is therefore the objective of the invention, starting from this known state of the art, to provide a diagnostic system for motor vehicles, the test unit and display system of which is the component of a combination instrument of the motor vehicle, in which case the test unit is connected with control systems that are to be monitored via a simple bus system for the transmission of serial, digital information. The serial bus includes a unidirectional stimulating line connecting the test unit and the plurality of control systems for initializing serial communication with individual control systems and a communication line for transferring serial digital information between the individual control systems and the testing unit. The communication line may be bi-directional for communication with bi-directional control systems or unidirectional for bringing information from the individual control systems to the testing unit. The display, which is used for displaying operational information in a combination instrument, is also used with the testing unit for displaying the requested defect reports received from storage areas of memories of the individual control systems. A plug is provided on the testing unit to receive a diagnostic plug to change the combination instrument with the testing unit and display into a diagnostic mode. The plug may also be used to receive an external diagnostic system to be used with the combined instrument and display or having its own display. A function changing switch is connected to the testing unit for controlling the diagnostic sequence and the diagnostic mode. The switch may include four switches. The first switch is used to select the control unit to be diagnosed and may include a counter for sequentially addressing the individual control systems in response to multilple activations of the first switch. A second switch is provided for initializing and requesting defect reports from the selected control units. In response to the activation of the second switch, the display shows the unit address, its identification, its requested defect report and query whether its storage area should be erased. A third switch, in combination with logic, is provided for erasing the defined storage area after the query and upon actuation of third switching. A fourth switch may be provided which causes automatic sequencing of the diagnostic sequence in the diagnostic mode.

The diagnostic system may also include vehicle self-diagnostics for recognizing and reporting defects during the operation of the vehicle. The display may also include requested behavioral responses from the driver in response to the self-diagnostic test. When the diagnostic system is in the diagnostic mode, its display takes precedence over any self-diagnostics. An external unit may be plugged into the testing unit or directly to the serial bus system. The testing unit is permanently connected with the control systems and in the diagnostic mode takes over the master control function of all the control systems.

The main advantages of the invention are its unproblematic construction, the use of components that are already contained in the combination instrument and a clear display of detected defect reports. By the use of a simple serial bus system, the wiring expenditures are also reduced. The system is therefore simple, sturdy, cost-effective and can also be housed in a space-saving way.

Other objects, advantages and novel features of the present invention will become apparent from the following detailed description of the invention when considered in conjunction with the accompanying drawings.

DETAILED DESCRIPTION OF THE DRAWINGS

Figure 1:
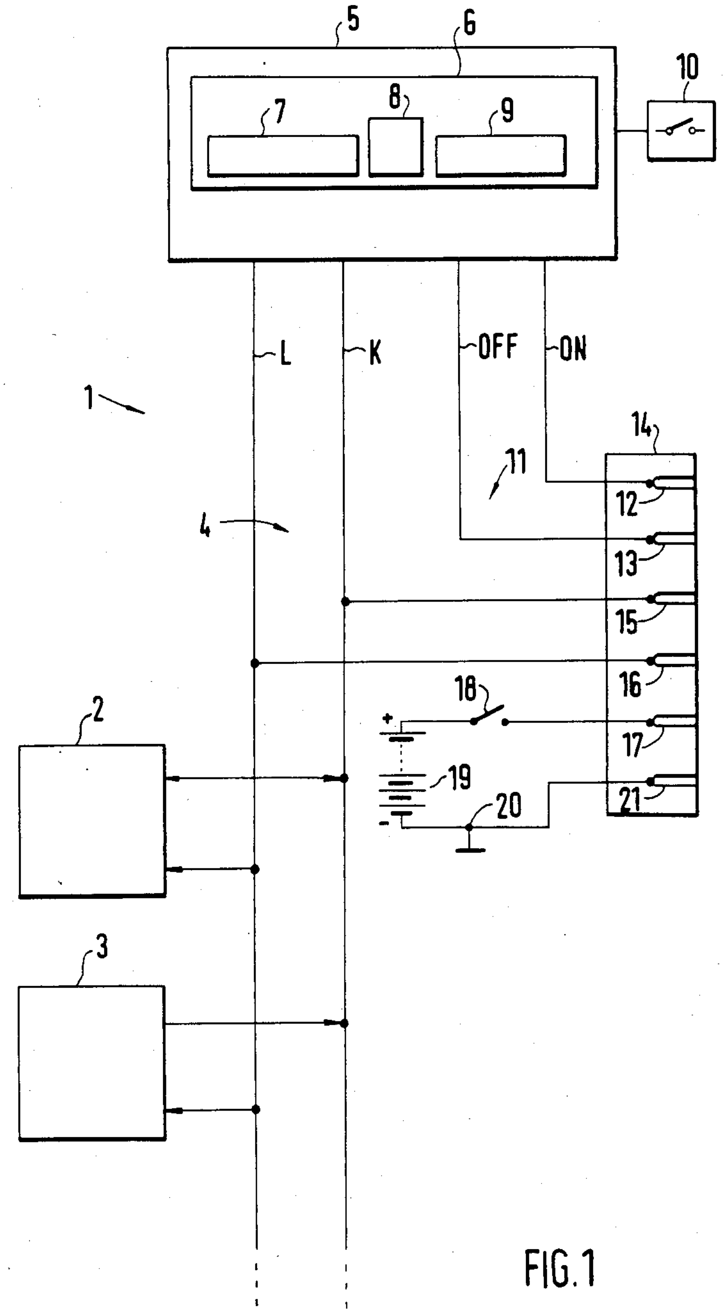
FIG. 1 is a block diagram of a combination instrument of a vehicle having several control systems connected via a bus system and having a plug-in arrangement according to the principle of the present invention.

FIG. 1 shows a diagnostic system for a motor vehicle. Control systems 2, 3 are assigned to operating systems of the motor vehicle, such as an electronic fuel injection system, an antilock brake system or a similar system. The control systems, via a diagnostic bus 4, are connected with a testing unit that will be described later, within a combination instrument 5. A display system 6 of this combination instrument 5 visible to the driver, in this case, is arranged in a dashboard area (not shown).

The display system 6 may include for example one or several display units 7, 8 and 9 on which symbols and/or alpha-numerical signs can be represented. The display units 7, 8 and 9 may, for example, be assigned to an electronic odometer 7 as well as multifunction displays (function display 8 and data display 9) of a commercially available vehicle-based computer. For example, driving data includes a display of a corresponding function and of the pertaining data and can be preselected outside the diagnostic mode by means of a function-changing switch 10.

The testing unit within the combination instrument 5 is connected, via control lines 11, with contact bushings 12 and 13 of a plug-in arrangement 14. By means of these, the combination instrument 5 with the testing unit and the display system 6 can be changed into a diagnostic mode. Two control lines 11 are provided, in which case the first ON control line (contact bushing 12) is used for changing the diagnostic system 1 into an on-board diagnosis and the second OFF control line (contact bushing 13) is used for changing the system into an off-board diagnosis (diagnosis by means of an external diagnostic system). At the contact bushings 15, 16 of the plug-in arrangement 14, the diagnostic bus 4 is also connected. Finally, a contact bushing 17, is connected via an ignition switch 18 with a positive pole (+) of a battery 19. The negative pole (−) of the battery 19 is connected at a vehicle mass 20 and a contact bushing 21 of the plug-in arrangement 14.

The diagnostic bus 4 consists of a unidirectional stimulating line L (contact bushing 16) and a unidirectional or bidirectional communication line K (contact bushing 15). A diagnostic bus of this type is, for example, described in a working paper (ISO Paper) N 448, Page 5, of the International Organization for Standardization, Work Group for Diagnostic Questions.

Via the diagnostic bus 4, an arbitrary number of two different types of control systems 2, 3 can be addressed: Type I control systems (control system 2) that are capable to carry out a bidirectional communication (data exchange) with the testing unit via the communication line K and those of the simpler Type II (control system 3), in which the communication line K is used only for a unidirectional communication (response line from the control apparatus to the testing unit).

The stimulating line L is used by the testing unit for addressing a certain control system or causing an erasure of a storage area for error messages (Type II) (transmission of control commands (Type II) and addresses). The communication line K is used for the transmission of diagnostic data and in the case of control apparatuses of Type I, in addition, for transmitting special diagnostic control commands and addresses.

Figure 5:
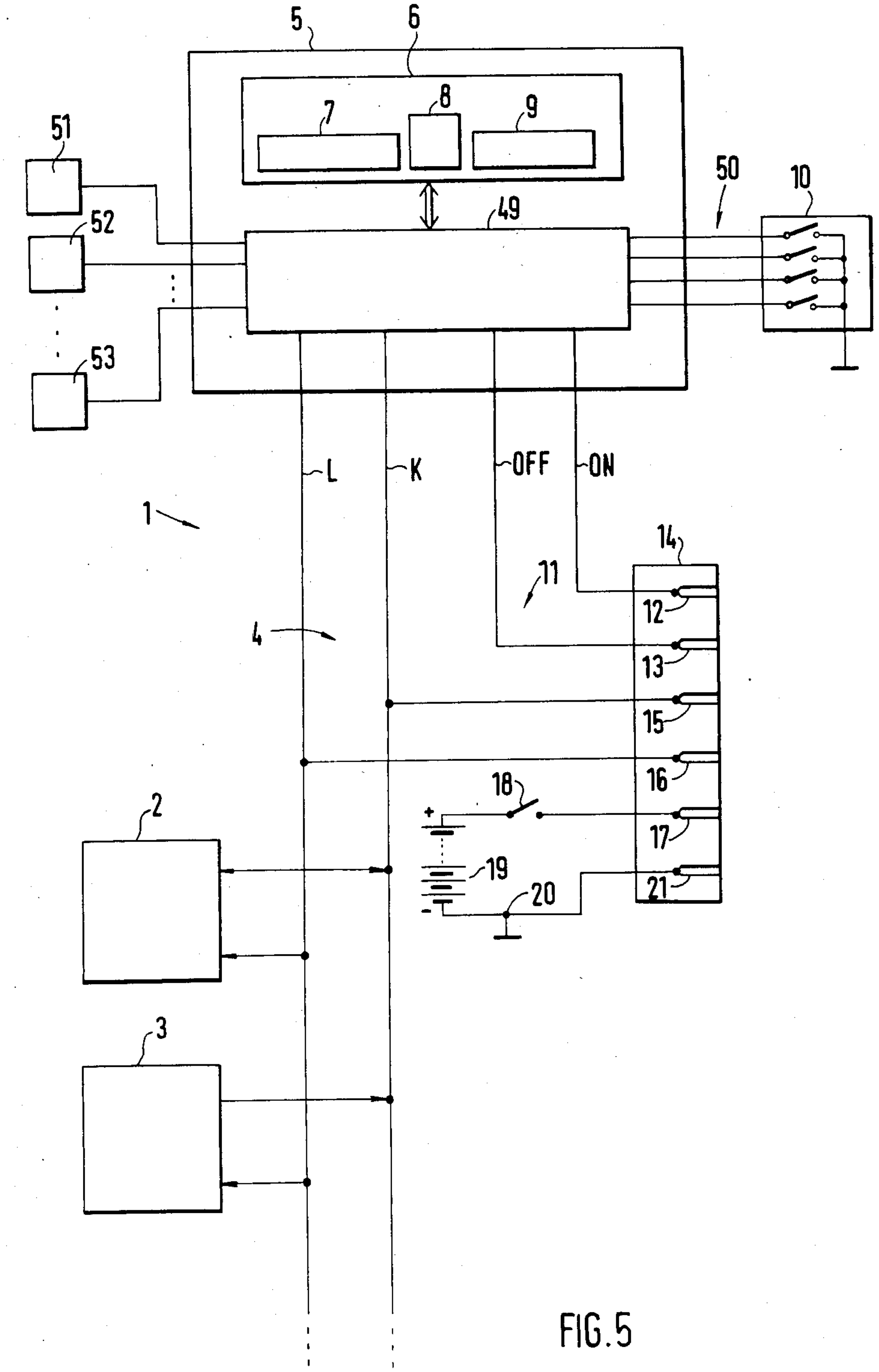
FIG. 5 is a block diagram with the details of a combination instrument according to the principles of the present invention.

In the case of on-board diagnosis, the diagnostic sequence is controlled by means of the function-changing switch 10 by an operator. For this purpose, it should have at least three switches, in which case, the first switch is used for the selection of the control system to be diagnosed; the second one is used for initializing and for requesting the error output; and the third one is used for erasing the storage area for error messages in the case of addressed control systems. If a fourth switch is provided, as illustrated in FIG. 5, it is used for initiating an automatic, sequentially occurring diagnostic sequence.

The selection of the control system to be diagnosed in this case takes place by actuating the first switch once or several times, in which case, with each actuating, a control address is increased sequentially and a symbolic system address is displayed in the display system 6 (display unit 8).

By means of a first actuating of the second switch, the addressed control system is initialized and a control system identification is displayed that further specifies a control system. By means of a further actuating of the second switch, a number of errors and/or type of errors and/or duration of errors and or frequency of errors and/or environmental factors during the occurence of an error is displayed. As the last display, a query is displayed as to whether the storage area for error reports is to be erased, which can be triggered by actuating the third switch.

The displays, that during the diagnostic sequence appear on the display system 6, may take place either in plain language or in code form. The decoding will then take place by the operator by means of a corresponding control-system-specific table.

For reasons of clarity, the power supply system for the combination instrument 5 is not shown.

Figure 2:
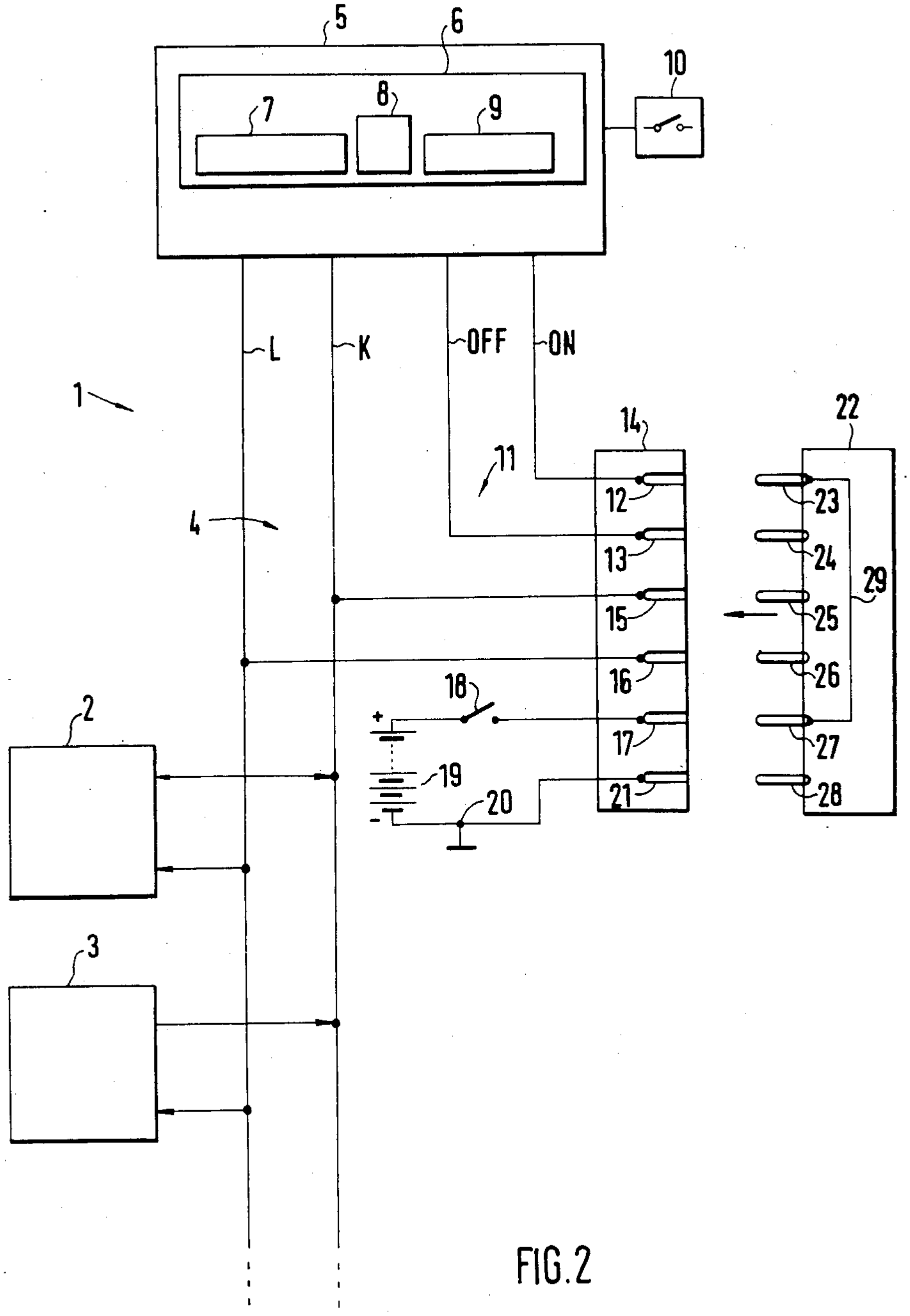
FIG. 2 is a block diagram similar to FIG. 1, but with an inserted diagnostic plug for a self-diagnosis of the vehicle.

For starting and carrying-out the on-board diagnostics, a diagnostic plug 22 must be inserted into the plug-in device 14 as shown in FIG. 2. The diagnostic plug 22 comprises contact pins 23 to 28 that in this case come into an electrically conducting connection with the corresponding contact bushings 12 to 13, 15 to 17 and 21.

In the case of the on-board diagnostics, the diagnostic plug 22 only has a short-circuiting bridge 29 that bridges the contact pins 23 and 27. In the inserted condition, the diagnostic plug 22 therefore connects the ON control line with the positive pole (+) of the battery 19, if the ignition switch 18 is closed. As a result, the combination instrument is changed into the self-diagnostic mode.

Figure 3:
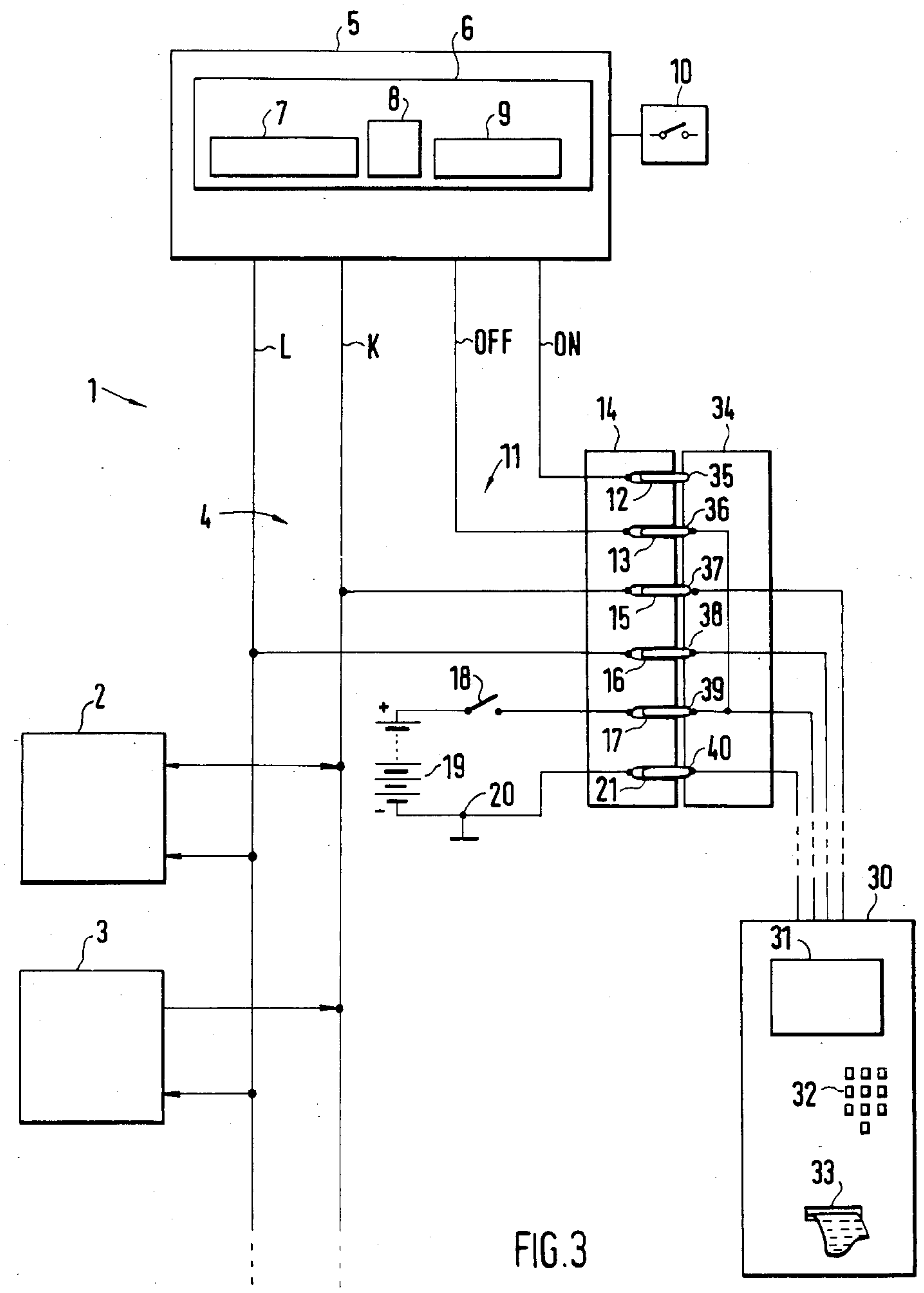
FIG. 3 is a block diagram similar to FIG. 2, but with a connected external testing unit.

The off-board diagnosis, as illustrated in FIG. 3, is carried out by means of an external diagnostic system 30 that has all components required for this purpose, such as a testing unit (not shown), a display 31 and operating elements 32 (function-changing switches). This external diagnostic system may also comprise a control computer that automatically controls the sequence of the diagnosis, as well as, for example a printer 33.

For this purpose, the external diagnostic system 30 must be connected by means of a diagnostic plug 34 for off-board diagnosis via contact pins 35 to 40 with the contact bushings 12 to 13, 15 to 17 and 21 of the plug-in arrangement 14. A short-circuiting bridge, in this case, connects the OFF control line, when the ignition switch 18 is closed, with the positive pole (+) of the battery 19. This deactivates the on-board diagnostics via the contact pins 37 to 38, the external control apparatus is connected with the diagnostic bus 4 and, if the external diagnostic system 30 does not contain its own power supply, is connected, via the contact pins 39, 40 with the battery 19.

However, the external diagnostic system 30 may also be constructed in a simpler way and may correspond to the diagnostic system built into the combination instrument 5. For this purpose, it comprises only the testing unit, the display 6 and the function switch 10. These are housed in a joint housing and thus make it possible for the operator to carry out a diagnosis also outside the vehicle. In addition, this external diagnostic system may also be used for vehicles that, for reasons of economy, do not have their own testing unit in the combination instrument 5 and in which only the control systems 2, 3 are connected via the diagnostic bus 4 with one another and with the plug-in arrangement 14. In this case, the connections from the control systems 2, 3 and the plug-in arrangement 14 to the combination instrument 5 do not exist.

Figure 4:
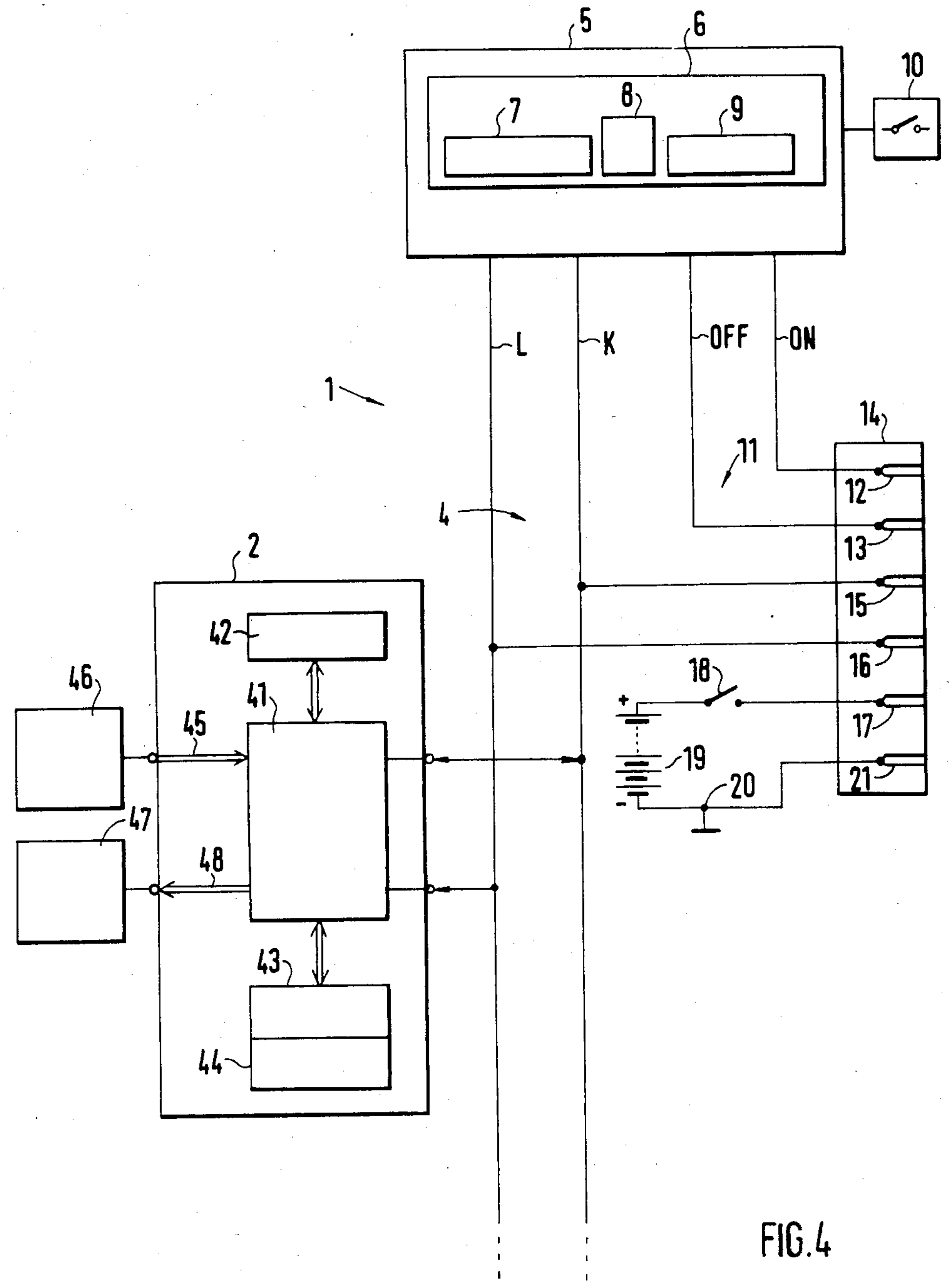
FIG. 4 is a a block diagram with the details of a control system according to the principles of the present invention.

The control system 2, that is described in detail in FIG. 4, is a Type I control system. It differs from Type II essentially in the direction of the data traffic on the communication line K.

The control system 2 is generally constructed on the basis of a microcomputer 41 having a main memory (RAM) 42 and nonvolatile (ROM, PROM, EPROM) 43 and electrically erasible (EEPROM) 44 storage means. The storage means 44, among other things, are used as error storage means. The microcomputer 41 that acquires analog and/or digital signals of the function from systems sensors 46, via input lines 45, and as a function thereof, control their final control elements 47 via output lines 48.

The combination instrument 5 shown in FIG. 5, in addition to the display 6, also has other display units that are not shown, such as a speedometer, a tachometer, etc. that may also be designed in the form of a display.

The testing unit may be a microcomputer system 49. The diagnostic bus K, L is connected with the microcomputer system 49 via a serial interface and the display 6 is connected with the microcomputer system 49 via a serial or parallel interface. The control lines 11 and the lines 50 of the function-changing switch 10 reach the microcomputer system 49 via digital inputs.

Naturally, the microcomputer system 49 may also be used as a joint control system for the testing unit and the (not shown) additional display units and the display 6. It will then receive additional signals from analog and/or digital transducer 51 to 53, such as a speed transducer 51, a tacho-transducer 52, a temperature transducer 53, etc. The microcomputer system 49 is thus utilized much more effectively. The diagnostic system is used when the vehicle is stationary and the control of the displays from sensor is used when the vehicle is moving, as a rule, and thus, are not used simultaneously. Thus, a single display can be shared.

The microcomputer system 49 and the control systems 2, 3, in addition to the shown components, also comprise memories, clock generators, circuits for signal editing, driver stages and other components required for their operation. Since these are generally known to the expert, they, along with the power supply, were also not shown.

Figure 6A:
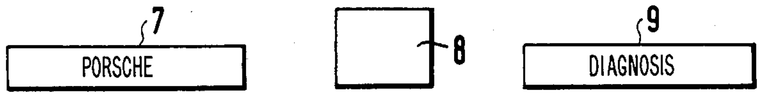
FIGS. 6A through 6H are a representation of character units that can be shown on a display unit.

FIGS. 6A–H show examples of possible displays on the display system 6 during the diagnostic process. FIG. 6A shows a display as it apPears after the insertion of the diagnostic plug 22 into the plug arrangement (corresponding to FIG. 2) on the display units 7 to 9. It indicates that the diagnostic system 1 is an a diagnostic mode.

Figure 6B:
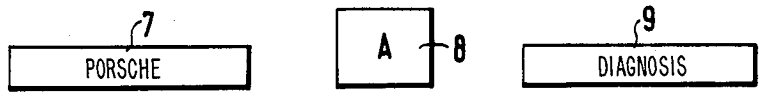
Figure 6C:
Figure 6D:
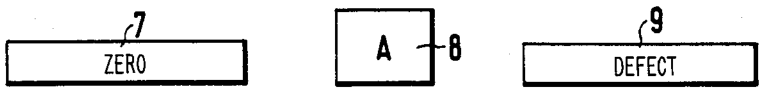

After the actuation of the first switch, a preselected control system (such as an ABS control system) is displayed on the display unit 8 corresponding to FIG. 6B. After the initializing of the control system, the control system provides its identification to be displayed corresponding to FIG. 6C. The operator determines from a table, what type of control system is involved (manufacturer, make, serial number, etc.). Upon further actuation of the second switch, either a display takes place corresponding to FIG. 6D, if no defect exists in the system, or a display of defects or defect-pertaining information values corresponding to FIG. 6E. By means of the displayed defect code of display 9, the operator may ascertain from the above-mentioned table what type of defect it is or which partial system of the diagnosed control system contains an error or a defect.

By means of a further actuating of the second switch, the residual defects in the system can be displayed. After all defects were displayed, the last inquiry asks whether the defect stored in memory of the control system is to be erased (FIG. 6F). This may take place by actuating the third switch. The acknowledgement will then be the display corresponding to FIG. 6G.

The process will then be repeated by the selection of the next control system (slight touching of the first switch), as described beginning with a FIG. 6B display. FIG. 6H shows what display appears when an input is being processed.

The diagnostic process is finally terminated by pulling the diagnostic plug 22 out of the plug arrangement. The microcomputer system 49 of the combination instrument 5 may naturally have a programming possibility that modifies the display corresponding to the language of the operator's country (language coding).

The same or different diagnostic sequence and display may be carried out by the external diagnostic system 30 of FIG. 3.

Figure 7:
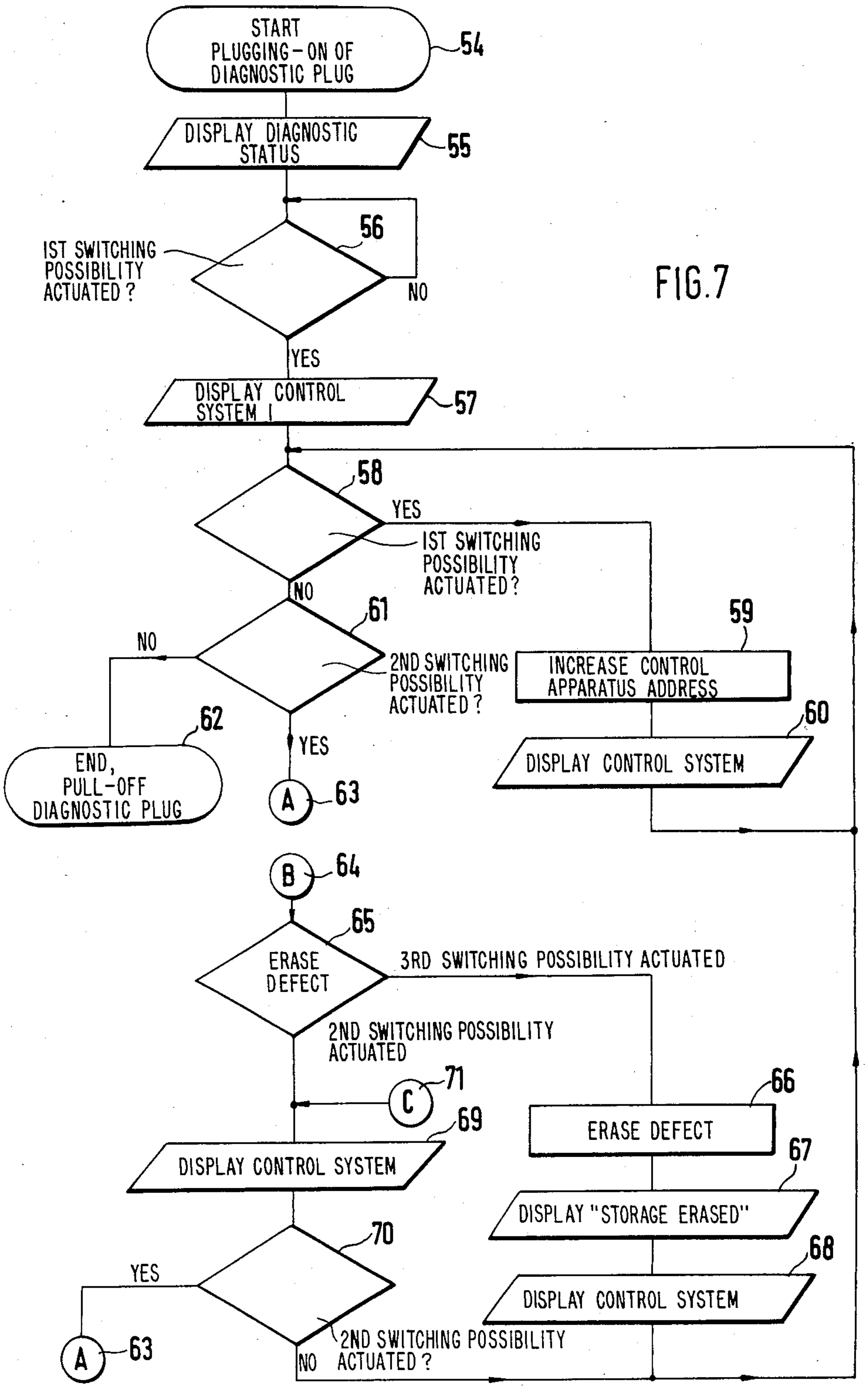
FIG. 7 is a flow diagram showing the diagnostic sequence according to the principles of the present invention.
Figure 8:
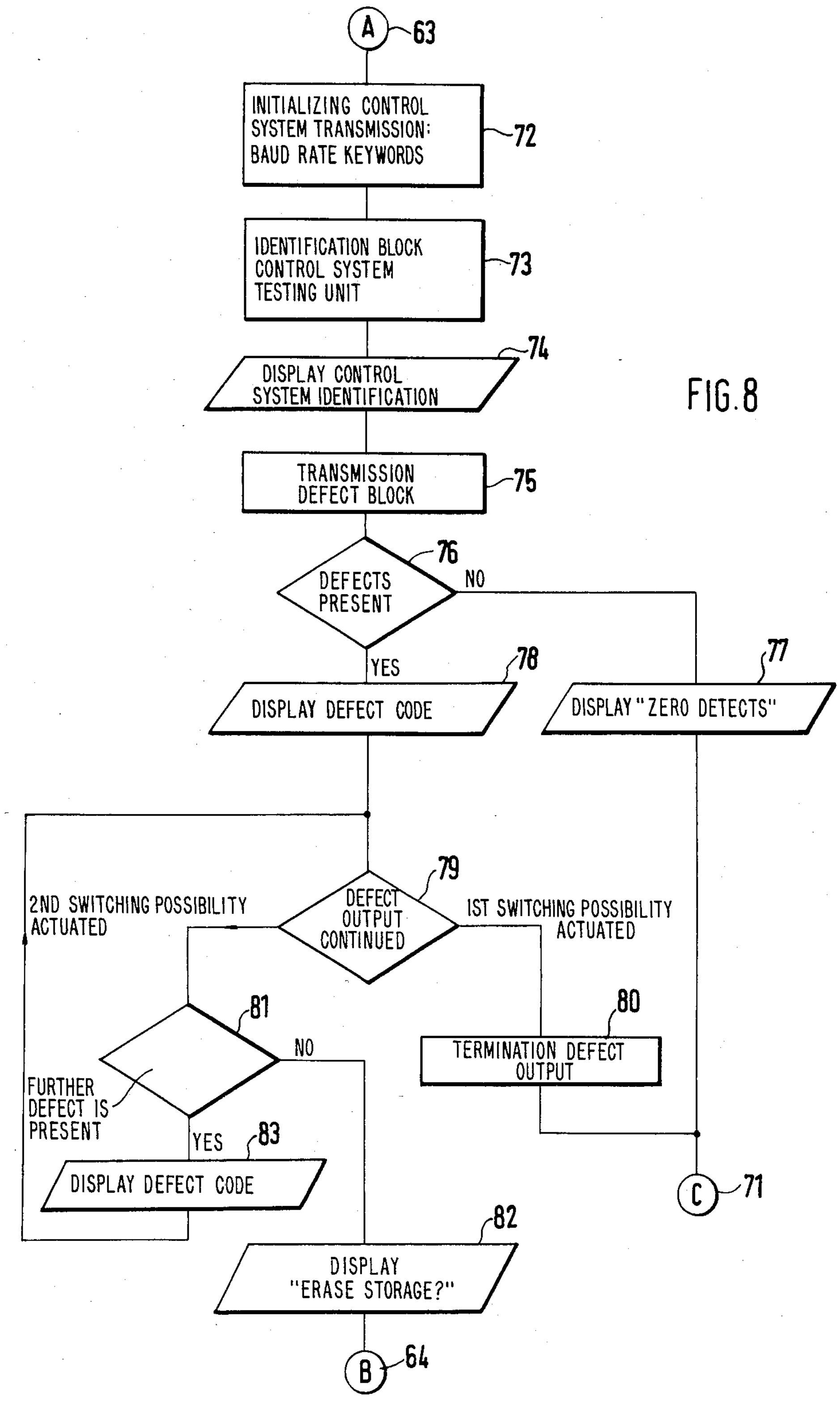
FIG. 8 is a partial representation of the flow diagram according to FIG. 7 for control apparatuses that are capable of carrying out a unidirectional data transmission on a communication line.

On the basis of the flow diagram shown in FIGS. 7 to 9, a diagnostic sequence will now be explained in detail. In this case, manual interventions are marked in an oval shape, while parts of the diagnostic sequence to be carried out by the testing unit according to a program are marked by means of rectangles (carrying-out of a part), diamonds (inquiries), parallelograms (displays) and circles (program branches).

In a first step, 54 (FIG. 7), the diagnostic mode is started by inserting the diagnostic plug 22 in the plug arrangement 14. Then the diagnostic mode is indicated, 55 (FIG. 6A). Next the testing system goes into a wait loop, 56, until the first switch of the function-changing switch 10 is actuated. Subsequently, the first control system is displayed, 57 (FIG. 6B).

It inquires whether the first switch is actuated another time, 58. If this is the case, a control apparatus address is increased, 59, and the addressed control apparatus is displayed, 60 (FIG. 6B), and returned for inquiry 58. If this is not the case, an inquiry takes place, 61, as to whether the second switch is actuated. If this is not the case, the diagnostic process is terminated and the diagnostic switch 22 may be pulled out, 62. If this is the case, a defect output takes place corresponding to FIGS. 8 or 9, depending on whether it is a control system with a unidirectional or bidirectional K-line (branching at A, 63).

When the system returns from the defect output at a branching point B, 64, an inquiry will take place as to whether the defect stored in memory is to be erased, 65, (FIG. 6F). If the third switch is actuated, the defect stored in memory is erased, 66, and a display takes place that the defect stored in memory is erased, 67, (FIG. 6G) and a display of the selected control system, 68. Subsequently, the testing unit returns to the inquiry 58 to determine the next selected control system.

If, during the erase inquiry 65, the second switch is actuated, the previously selected control system is displayed, 69. Subsequently, an inquiry, 70, takes place again as to whether the second switch was actuated again. If the answer is yes, a return takes place to the branching at A, 63, by means of which the defect output of the selected control system may be repeated; if the answer is no, return takes place to the inquiry 58.

The defect output that now is taking place between the branching points A, 63, and B, 64 or C, 71, in which case the latter occurs between the inquiry 65 and the display 69, depends on the type of the control system. If it is the simpler Type II with a unidirectional K-line, it takes place as follows according to FIG. 8.

After the initializing of the control system by the testing unit, this control system transmits a signal, by means of which the testing unit can recognize the data transfer speed (baud rate). This type of baud-rate recognition is, for example, described in DE-OS No. 35 37 477. In the same way, some keywords are transmitted by means of which the testing unit is informed concerning a specification of a subsequent serial communication and a configuration of the hardware, 72. Subseqently, one or several identification blocks are sent from the control system 3 to the testing unit, 73, whereupon a control system identification corresponding to FIG. 6C appears on the display unit 8, 74. Then a transmission of a defect block takes place, 75. If no defects exist, inquiry 76, the display "zero defects", 77, appears corresponding to FIG. 6D, after which the testing unit returns to the branching point C, 71.

Figure 6E:
Figure 6F:
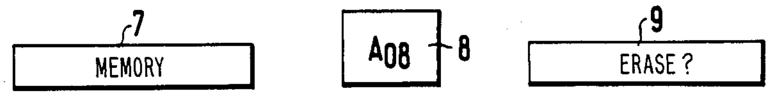
Figure 6G:
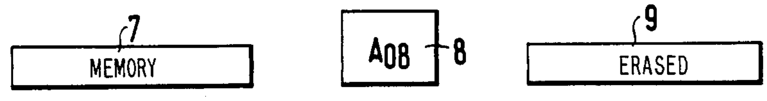
Figure 6H:

If defects do exist, a defect code and, if available, defect-pertaining information values are displayed, 78, corresponding to FIG. 6E. Subsequently, it is inquired as to whether the defect output is to be continued, 79. If the first switch is actuated, the defect output is terminated, 80, and a return takes place to the branching point C, 71.

If, however, the second switch is actuated, an inquiry takes place next, as to whether other defects exist, 81. If the answer is no, a display "erase memory?", 82, takes place corresponding to FIG. 6F and a return to the branching point B, 64. If the answer is yes, a display appears of the actual defect code, 83, corresponding to FIG. 6E, after which the testing unit returns to the inquiry 79.

Figure 9:
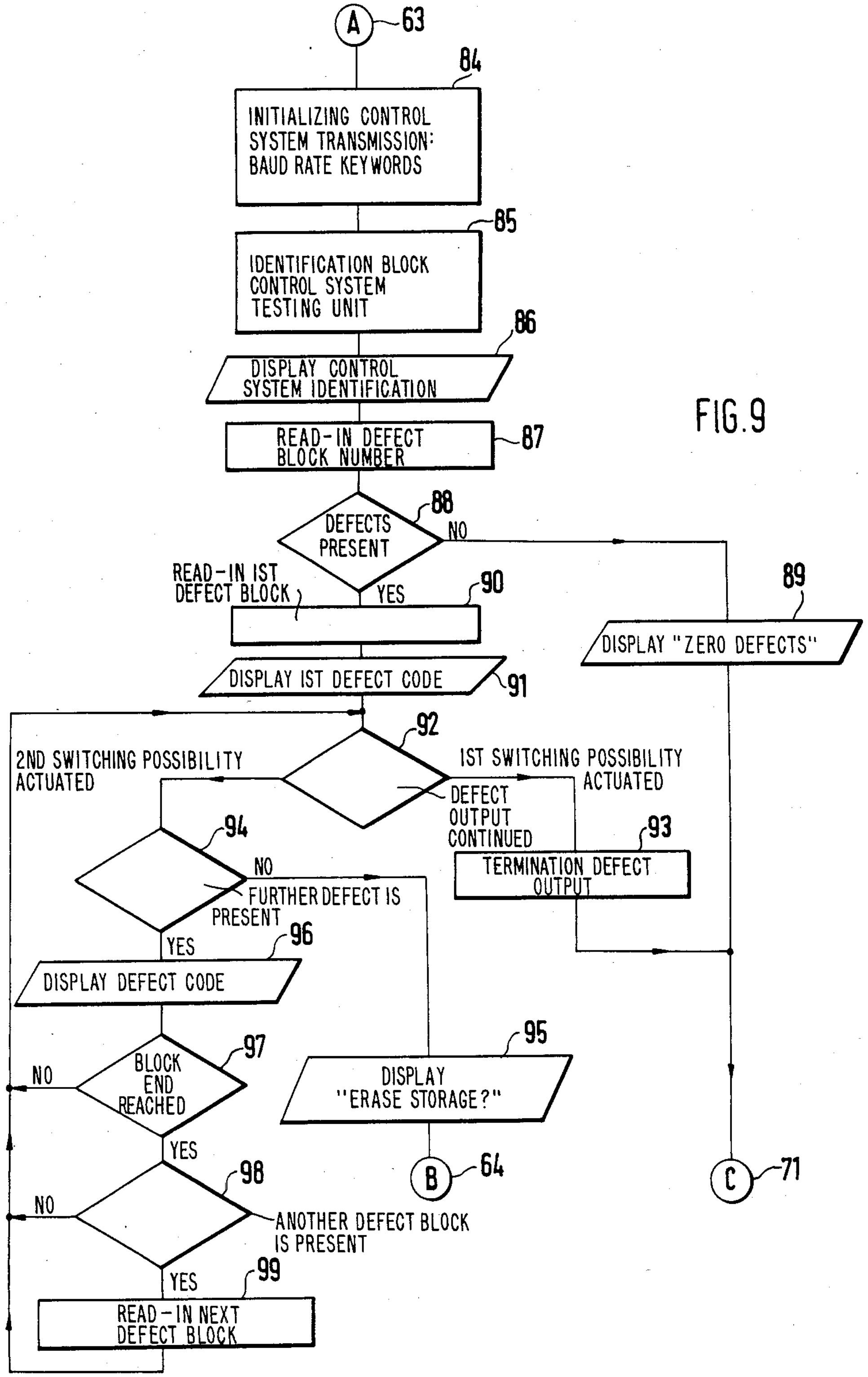
FIG. 9 is a partial representation of the flow diagram according to FIG. 7 for control apparatuses that are capable of carrying out a bidirectional data transmission on a communication line.

In the case of control apparatuses of Type I having a bidirectional communication line K, the defect output, corresponding to the expanded possibilities, is a little more extensive (FIG. 9).

Starting from branching point A, the initialization of the control system first takes place again by the testing unit and the transmission of the signal for the recognition of the baud rate and of the keywords by the selected control system, 84. Subsequently, the control system again sends one or several identification blocks to the testing unit, 85, after which this testing unit displays the control system identification, 86 (corresponding to FIG. 6C). After the reading-in of the number of defect blocks, 87, that are to be transmitted, by the testing unit, the display "zero defects", 89, occurs, corresponding to FIG. 6D, if no defects are present. Subsequently, the system returns to the branching point C, 71.

If defects do exist, a reading-in of the first defect block 90 occurs, and a defect code of a first defect in the first defect block is displayed, 91 (FIG. 6E). Then an inquiry takes place as to if the defect output is to continue, 92. If the first switch is actuated, the defect output is terminated, 93, and the testing unit returns to the branching point C, 71. If an actuation of the second switch takes place, it is first investigated whether other defects or defect pertaining information values exist, 94.

If this is not the case, the display "erase memory?", 95, takes place corresponding to FIG. 6F, as well as the return to the branching point B, 64. If the answer is yes, a next defect code is displayed, 96. Upon an inquiry 97, when the end of the defect block is not reached, a return takes place to the inquiry 92, and otherwise, it is determined whether another defect block is present, inquiry 98. If this is not the case, a direct return takes place to the inquiry 92, otherwise a next defect block is read in before this return, 99.

The error and control apparatus identifications may naturally also appear in plain text, instead of in code form, on the display systems, if these are designed correspondingly.

It may also be provided that the function-changing switch 10 comprises a fourth switch by means of which in the diagnostic mode, an automatic diagnostic sequence can be controlled that displays respective defects for some time or indicates them on an (external) recording unit. In this case, all control systems are diagnosed one after the other and all defects are read out. However, it would also make sense here for the erasing of the defect stored in memory to take place manually.

The diagnostic system may also comprise a vehicle self-diagnosis that—also during the driving—permanently recognizes general and/or safety-relevant system defects in the control or operating systems and/or other vehicle components and displays them to the driver during the drive.

In this case, the defect display in the diagnostic mode may be limited to special system defects, whereas, outside the diagnostic mode, general system defects of the motor vehicle can also be displayed. It may also be provided that the display of system defects is accompanied by additional instructions concerning the driver's behavior that concern the respective system defect (such as, "drive to repair station," "continue to drive slowly," "stop immediately,", etc.).

Finally, the testing unit and/or the combination instrument 5 may also comprise a self-monitoring function and/or may be capable of being tested or monitored by the external diagnostic system.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed:

1. A diagnosite system for a motor vehicle that is equipped with several control systems assigned to functional systems of the motor vehicle, such as an electric fuel injection system and an antilock brake system, said control systems being equipped with a self-monitoring means and a nonvolatile memory having a defined storage area for defect reports; said diagnostic system comprising:

- a testing unit for initializing communication with individual control systems and requesting defect reports;
- a two line serial bus system in said vehicle for connecting said testing unit and said control system and including a unidirectional stimulating line for initializing a serial communication with individual control system and a communication line for transferring serial digital information between the individual control systems and the testing unit;
- display means in said vehicle connected to a combination instrument for displaying operational informaiton and connected to said testing unit for displaying said requested defect reports; and
- activation means for activating said testing unit and changing the combination instrument with the test unit and the display system into a diagnostic mode to initiate communication and display defect reports.

2. A diagnostic system according to claim 1, wherein said communication line bidirectionally communicates a first type of control system with the testing unit, and unidirectionally communicates from a second type of control system to the testing unit.

3. A diagnostic system according to claim 1 wherein said activation means includes a plug means connected to the testing unit, and a diagnostic plug means being insertable into said plug means for changing the combination instrument with the testing unit and the display system into a diagnostic mode.

4. A diagnostic system according to claim 3, including a function-changing switch means connected to said testing unit for controlling a diagnostic sequence in the diagnostic mode.

5. A diagnostic system according to claim 4, including analog means for connecting the serial bus system with an external diagnostic system, display means and function-changing switch means.

6. A diagnostic system according to claim 5, wherein the testing unit and the combination instrument includes a self-monitoring function and can be tested or monitored by external diagnostic systems.

7. A system according to claim 4 wherein said function-changing switch includes:

- first switching means for the selection of the control system to be diagnosed;
- second switching means for the initializing and for the defect rport requesting of the selected control system, and
- third switching means for erasing the defined storage area for the defect reports.

8. A diagnostic system according to claim 7, wherein said testing unit includes addressing means connected to said first switching means for sequentially addressing said control systems in response to plural activations of said first switching means, and said display means displays a symbol representative of the addressed control system.

9. A diagnostic system according to claim 4, wherein said testing unit includes initialization means for initializing a selected control system in response to a first actuation of the second switching means, and causing said display means to display a control system identification.

10. A diagnostic system according to claim 9, wherein said testing unit includes means responsive to further actuation of said second switching means for causing said display means to display one or more of the following: a number of defects, type of defects, duration of defects, frequency of defects, or environmental factors and concluding with an inquiry display as to whether the defined storage area for defect reports is to be erased.

11. A diagnostic system according to claim 10, wherein said testing unit includes means for permitting erasure of said defined storage area upon actuation of the third switching means after display of the inquiry.

12. A diagnostic system according to claim 4, wherein the function-changing switch means includes a switching means for automatically sequencing a diagnostic sequence in the diagnostic mode.

13. A diagnostic system according to claim 1, wherein said combination instrument includes an electronic odometer connected to said display means and an on-board computer connected to said display means.

14. A diagnostic system according to claim 1, wherein said display means displays in plain text or in code form.

15. A diagnostic system according to claim 1, including a vehicle self-diagnosis means for recognizing defects in the control systems and other vehicle components during operation of said motor vehicle, and said display means displays them to the driver.

16. A diagnostic system according to claim 15, including means for generating directions to be displayed for the behavior of the driver of the vehicle that concern the respective system defect recognized during the self-diagnosis.

17. A diagnostic system according to claim 16, including means for permitting a display of first type of system defects of the motor vehicle outside the diagnostic mode and for limiting display to specific second type of system defects while in the diagnostic mode.

18. A diagnostic system according to claim 1, wherein activation means includes a plug means, for connecting said testing unit with an external intelligent service testing apparatus, that automatically controls the diagnostic sequence and reads its result.

19. A diagnostic system according to claim 1, wherein the testing unit is in permanent communication with the control systems and in a diagnostic mode, takes control of all control systems connected to the bus system.

* * * * *